April 27, 1948.    H. HELTZER ET AL    2,440,584
LENTICULAR REFLEX REFLECTOR SHEET AND METHOD OF MAKING THE SAME
Filed June 19, 1944
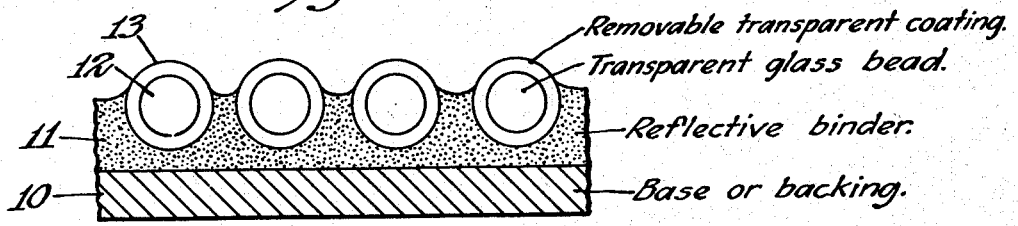
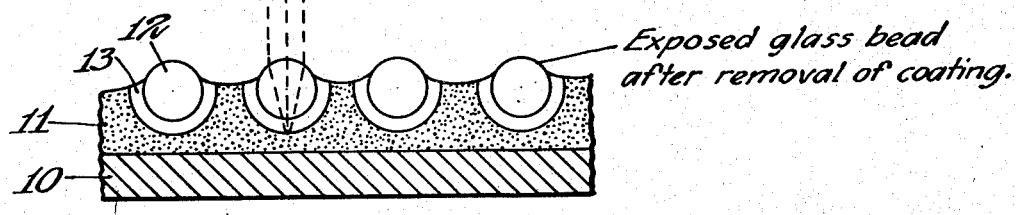
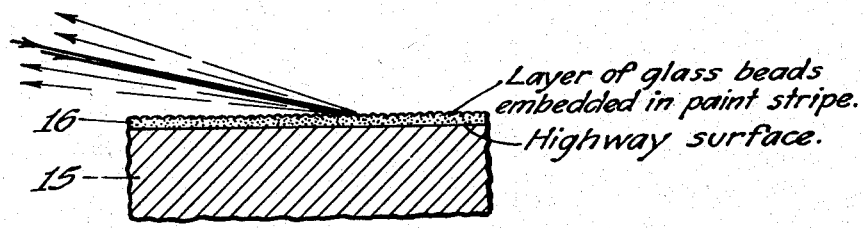
INVENTORS
Harry Heltzer
John Edmund Clarke
Carpenter, Abbott, Coulter & Kinney
ATTORNEYS Patented Apr. 27, 1948

2,440,584

UNITED STATES PATENT OFFICE 2,440,584

LENTICULAR REFLEX REFLECTOR SHEET AND METHOD OF MAKING THE SAME

Harry Heltzer and John Edmund Clarke, St. Paul, Minn., assignors to Minnesota Mining & Manufacturing Company, St. Paul, Minn., a corporation of Delaware Application June 19, 1944, Serial No. 540,944

5 Claims. (Cl. 88—82)

This application is a continuation-in-part of our copending parent application Ser. No. 350,642, filed August 3, 1940 (since issued as Patent No. 2,354,018 on July 18, 1944).

This invention relates to reflex light reflectors of the class wherein a surface layer of small glass spheres or beads is united to a reflective support as, for example, by being partially embedded in a reflective binder layer. Such reflex reflectors have the property of returning an incident ray of light back toward its source, even though the ray strikes it at an angle, whence the term "reflex." The glass spheres constitute convex lens elements which refract the incident light, before it strikes the underlying reflective surface, and refract the emergent light, so as to collimate it and largely concentrate the reflected light in a narrow cone having substantially the same axis as that of the incident light. Reflex reflector sheets may be used very effectively in making highway safety and traffic control signs, since at night such signs appear much more brilliant or luminous than ordinary signs (which diffuse the incident light), making them visible to the drivers of approaching vehicles at a great distance. The light from the head-lights of an approaching vehicle is returned to the vehicle, and to the eyes of the driver, to a much greater extent than would be the case if it were dissipated in all directions by a sign having a diffusing surface.

The present invention provides an improvement in this class of reflex light reflectors, and thus also in those signs, markers or other indicia in which the reflector is utilized. The invention provides a way of improving the anchorage of the small glass spheres or beads, but the most important result is to provide an optical structure, capable of being employed in commercial practice, which makes for high brilliancy of the reflected light, as viewed on or near the axis of the incident light, even when the incident light strikes the reflector at a large angle from the perpendicular. The improved reflector has what is called a good "angularity" characteristic notwithstanding the high brilliancy secured.

The difficulty has been to secure a combination of high brilliancy and good angularity. In the case of the well known "reflector buttons" and of signs employing them, and similar reflex type signs in which the lens elements are relatively large, or are molded in a glass plate, it is possible to employ arrangements of construction and design, to secure desired optical properties, which have been inapplicable in the construction of beaded reflectors of the present class. Small glass elements, a few thousandths of an inch in diameter, of which many thousands are required for each square foot of surface, cannot, as a practical matter, be handled individually, cannot be formed in special shapes requiring individual orienting or positioning, and cannot be provided with individually constructed socketing or holding devices and reflectors. Small glass spheres (commonly called "beads") are used and they are commonly applied by sprinkling a mass of the beads upon a binder layer, which is plastic at the time of application and subsequently hardened or set-up, so as to become partially embedded as a layer. The present class of reflex reflectors thus involves many special problems.

Two general arrangements have been employed. In one, the small glass beads are partially embedded in a reflective binder, so that reflection occurs from the concave surface of the binder which is in direct contact with the under or rear surface of the glass bead. This gives good angularity, but at the sacrifice of brilliancy when beads of ordinary refractive index are used. Another arrangement (described in more detail in our parent application), is to partially embed the glass beads in a transparent binder layer structure, which spaces the beads from an underlying flat reflective surface. This spacing of the beads away from the reflective surface makes possible a greater brilliancy, but the brilliancy decreases with an increase of angle of incidence of the approaching light, particularly when the spacing distance is the optimum for light striking substantially perpendicularly (see the data in the P. V. Palmquist Patent No. 2,294,930).

The present invention overcomes these difficulties by providing a structure in which a concave reflector is provided for each individual glass sphere, however small, which is substantially concentric to and is spaced from the convex under or rear surface of the sphere, and an interposed transparent coating holds the sphere in fixed position. Thus each glass sphere is provided with an underlying concave reflector spaced from it by the intervening transparent coating which holds the sphere in place, and the radial distance from the center of the glass sphere to the reflector surface is greater than the radius of the sphere proper. The advantage of spacing to secure high brilliancy is combined with the advantage of a concave reflector to give good anuglarity, in a manner which provides for practical and commercial utility; which combination is novel and valuable in the glass beaded reflex reflector field.

Without limiting the scope of the invention, the following brief description indicates an illustrative way of accomplishing the object of this invention: The glass beads are preliminarily coated with a transparent binder coating so that each has a concentric coating or shell of transparent material bonded to it, which material may subsequently be removed to a desired extent. When such coated beads are thereafter partially embedded in the reflective binder layer of the reflector, which is plastic at this stage, the reflective binder becomes conformed and united to the transparent coating layer on each bead and is thus formed to provide a concave reflector underlying and spaced from each glass bead. After the reflective binder has become set or solidified, so that the beads are held firmly in place, the exposed part of the transparent coating on each bead is removed so as to expose the outer extremities of the glass beads. Thus the radial distance from the center of the glass bead to the reflector surface is greater than the radial distance to the outer surface of the lens element which receives the incident light. For beads of ordinary glass, having a refractive index of approximately 1.50–1.55, the optimum thickness of the transparent bead coating, to secure maximum brilliancy, is about 20–40% of the bead diameter; but a thinner coating will still give a marked improvement over a direct embedding of the glass beads in the reflective binder.

It is desirable to use small glass beads having a diameter not exceeding about 40 mils, and preferably not exceeding about 10 mils. Excellent results are obtained with glass beads having an average diameter in the range of about 3–6 mils, which also makes possible the use of quite thin coatings.

The invention makes for a particularly valuable improvement in the road striping field. It is well known to improve the night visibility of highway center stripes by using a reflective binder or "paint" having small glass beads partially embedded in its surface to secure reflex reflection. In this case the angularity characteristic should be as good as possible, since the light from the head lights of a vehicle will strike the center stripe at increasingly large angles of incidence the greater the distance ahead of the vehicle. This is directly opposite to the case of a vertical sign located substantially at right angles to the highway, as to which the farther away the vehicle the smaller the angle of incidence (i. e., the more nearly do the light rays strike the reflector substantially perpendicularly); and in which case the most important thing is to secure the maximum brilliancy for small angles of incidence, and it is not so important that in doing so the brilliancy at large angles of incidence has been materially sacrificed. The present invention makes possible glass-beaded road stripes in which the brilliancy is greatly increased even at large angles of incidence. In other words, the effect of using spacing between the under bead surface and the reflector is not neutralized by poor angularity, and hence the stripe will be visible at far greater distances ahead of the vehicle than is the case with the ordinary glass-beaded stripes of the prior art.

The present invention improves all types of reflex reflector signs of the glass beaded category, since the benefits of high brilliancy are not limited to signs where small angles of incidence are involved under maximum-distance viewing conditions. As a further example to illustrate the advantage of the invention, mention may be made of vertical highway advertising signs set at a substantial angle to the road, so that when an approaching car is a great distance away the incident light strikes at a large angle.

Other objects and features will be evident from the following more detailed description of illustrative embodiments of the invention.

In the following drawings which illustrate particular embodiments of the invention:

Fig. 1 is a diagram indicating the sectional structure of a glass beaded reflex reflector before removal from the beads of the exposed surface coatings, while Fig. 2 shows the finished reflector after removal of the coatings from the outer bead surfaces so as to expose the outer surfaces of the glass beads; and Fig. 3 is a longitudinal sectional diagram showing a glass beaded highway center stripe, and indicates reflected light rays returning in a concentrated cone toward the source of incident rays of light coming from the head lights of a vehicle.

Figs. 1 and 2 are not intended to be literal section views, but are diagrams arranged to more clearly show the essentials of the optical structure. Thus each circle represents a full circumference, which would not be the case in a literal section since the beads are not actually arranged in rows such that a section plane could be passed through the centers of a series of adjacent beads, but in practice have the relative positions which result from applying the beads by sprinkling on the surface of the reflective binder followed by partial embedding therein.

Fig. 1 shows the reflex reflector of Fig. 2 at an intermediate stage of making. Referring to Fig. 1, the reflex reflector structure is shown as comprised of a base or backing 10 coated with a reflective binder layer 11 in which is partially embedded a layer of small transparent glass beads (spheres) 12, each of which has a preformed concentric coating 13 of a removable transparent material, such as a suitable synthetic resin. Each glass bead is thus, at this stage, entirely surrounded by its transparent covering. The coated glass beads are sufficiently embedded so as to be mechanically held by the sockets provided by the reflective binder, the latter extending somewhat above the mid-circumference. The outer extremities of the coated beads are exposed so that the glass beads provide a multiplicity of adjacent convex lens elements which receive incident light rays. Subsequent to the fixing of the coated beads in the reflective binder layer, the coating 13 on each glass bead is removed insofar as it covers the outer extremity of the bead, so as to leave exposed the outer extremities of the glass beads, as shown in Fig. 2.

As shown in Fig. 2, the resultant optical structure provides a light-returning layer of spherical lens elements, each of which has an inner radius of curvature which is greater than the outer radius of curvature, due to the transparent coating which remains on the inner extremity of the glass sphere. That is, the radial distance from the center of each glass sphere to the surface of the reflective binder which contacts the outer surface of the transparent coating on the glass sphere, is greater than the radius of the glass sphere. The increment is the spacing distance, relative to the glass sphere. The coating not only provides this spacing, but provides the means for shaping the underlying surface of the reflective binder so that it provides a concentric concave reflector for each glass sphere.

The rays $a$ in Fig. 2 show the paths of incident paraxial rays striking the surface of a glass bead and being refracted so as to converge close to the point where the axis strikes the underlying reflective surface of the binder. It is evident that in consequence of the spacing of the reflective surface from the surface of the glass sphere, the rays come closer together than they would if such spacing had been omitted (as when uncoated glass beads are directly embedded in a reflective binder). This results in improved brilliancy since there is less divergence of the returning rays from the axis of the incident rays. Due to optical spherical aberration, there is no spacing distance such that the incident rays can be brought to a perfect focus (i. e. to a point) at the reflective surface, even if the glass beads were absolutely spherical. However, for a glass sphere of any given refractive index, there will be a spacing distance which produces optimum brilliancy. This distance (the radial thickness of the coating 13) is equal to approximately one-third the diameter of the glass sphere 12 when the glass has a refractive index of about 1.50–1.55. The optimum spacing distance decreases with an increase of the refractive index, becoming zero when the refractive index is approximately 1.85–1.90. This assumes that the spacing coating 13 has a refractive index equal to that of the glass sphere 12. The optimum spacing distance will be made less or greater, respectively, when the spacing coating has a refractive index less than or greater than that of the glass sphere. Improved brilliancy results even though the spacing coating has a thickness less than the optimum value which has been mentioned, and in fact a lesser thickness has the advantage, for some purposes (depending on the use of the reflex reflector), of providing a higher degree of divergency of the returning rays, thereby improving visibility for cases where the observer is located a substantial distance away from the axis of the incident light. Due to the concave, concentric reflective surface of the reflective binder which underlies each glass sphere, the angularity characteristic is much better than it would be if the glass spheres were spaced from an underlying flat reflective surface, since the distance from the center of the sphere to the reflective surface is the same whether the incident rays strike at an angle or perpendicularly to the plane of the reflex reflector sheet.

The coating 13 may also be used to advantage in providing for a firmer bonding of the glass bead to the reflective binder, as by employing a coating material which bonds more firmly to the glass and to the binder than the strength of bond which the binder would have for the glass directly.

It will be understood that the coating 13 may be formed by successively coating the glass beads so as to build up the desired total coating thickness. Moreover, such successive coatings need not have the same composition. For example, the coating in direct contact with the surface of the glass bead may be chosen for its ability to form a strong bond to the glass, and the outermost coating for its ability to form a strong bond to the reflective binder, the two coatings being either chosen so as to bond strongly to each other, or there being one or more intermediate coatings adapted to strongly unite the innermost and outermost coating layers.

The base or backing 10 may be of any desired material depending on the type of reflex reflector being made. Thus it may be a metal or wood base of a sign on which the reflective binder 11 is applied directly in making the sign; or it may be a flexible sheet (such as waterproofed cloth or paper, or a metal foil, or a film) which is used as a backing for the reflective binder and bead layers to form a flexible reflex reflector sheet product which can afterwards be cut to the desired shape and affixed to any desired base.

The reflective binder layer 11 may be a paint or enamel type of coating containing reflective pigment particles. The use of colored pigments will result in the reflected light having a corresponding color. An aluminum paint type of binder coating, containing flaked aluminum pigment, will cause a "silvery" appearance. The transparent coating 13 may also be colored to produce color effects, as by means of a suitable dye or transparent colored pigment included in the coating material prior to coating the beads. When an aluminum paint type of binder is used in combination with colored transparent bead coatings, the reflex reflected light will have this color instead of being "silvery," due to the color filter action of the interposed coating.

Descriptions of illustrative flexible backings and of reflective coatings will be found in the P. V. Palmquist Patent No. 2,294,930 (issued Sept. 8, 1942), in the M. L. Gebhard, H. Heltzer, J. E. Clarke and E. P. Davis Patent No. 2,326,634 (issued Aug. 10, 1943), and in our parent application Ser. No. 350,642, filed Aug. 3, 1940 (since issued as Patent No. 2,354,018 on July 18, 1944).

As a further illustration, the base 10 may be a horizontal road surface having a reflex reflecting stripe, marker or lettering made by painting the highway surface to form the desired insignia, sprinkling over the paint (while still soft) a layer of the coated glass beads, which are partially embedded, and subsequently (after the paint has dried) removing the transparent coatings from the outer extremities of the glass beads, resulting in the structure indicated in Fig. 2. It is desirable in making such horizontal reflex reflectors to employ an "open coat" formation of the beads, which means that they are applied in lesser amount than that needed to produce a beaded layer in which the beads are packed as closely as possible. This "open coat" formation, in which the beads are spaced appreciable or substantial distances apart, not only reduces the cost but increases the long-range visibility under night viewing conditions. The reason is that the rays from the head lights of vehicles are incident at a large angle (i. e. at a small angle to the horizontal), and light which would otherwise effectively strike a particular bead will be unduly cut off by an interposed closely contiguous bead, without being utilized by the latter. If the beads are spaced apart more than the optimum distance, there will of course be a loss in night-time visibility. However, extended spacing may be considered desirable in securing improvement in brilliancy as compared with a plain non-beaded paint stripe, even though less than the optimum attainable is secured, when cost is a major and overbalancing consideration.

Fig. 3 is a schematic longitudinal sectional view intended to represent a so-called beaded highway center stripe. The highway surface 15 is provided with a beaded paint stripe 16 running down the center of the highway as a guide line for motorists, having the structure previously described (see Figs. 1 and 2). Instead of removing the coatings from the beads as a step in the making of the center stripe, the coated spheres (see Fig. 1) may be left in place and dependence placed on traffic wear to abrade off the exposed coatings to produce the desired ultimate structure (see Fig. 2), the stripe having in the meantime at least as much visibility as an ordinary non-beaded paint stripe. In such case, the transparent coating for the glass beads should be of a kind which will rapidly abrade. When the projecting coating has been abraded off, further abrading will be substantially prevented as to the coating sandwiched between the contacting paint and bead surfaces.

Fig. 3 illustrates how incident light rays, from the head lights of a vehicle, give rise to a cone of reflex reflected light rays returning toward the light source, due to the use of glass beads in the paint stripe, thus improving visibility to the driver of the vehicle.

Glass bead coating

Various methods may be used for making coated glass beads (i. e. a glass bead 12 having a removable transparent coating 13 as shown in Fig. 1) for use in the manufacture of reflex light reflectors of the type which has been described. The coating should of course be waterproof when the coated beads are to be used in making reflex reflectors for exposed outdoor use. As previously mentioned, the ultimate total coating may be built up by employing a series of coatings, which may or may not have the same composition. Colored transparent coatings may be provided by including in the coating material a suitable dye or transparent color pigment.

The glass beads should preferably be thoroughly cleaned prior to coating to facilitate anchorage and insure clean boundary surfaces. As an example, the glass beads may be washed with a hot 5% solution of trisodium phosphate, and rinsed alkali-free with distilled water, followed by drying.

The transparent coating material may be applied in solution form, using a solvent vehicle which will evaporate off. Another expedient is to use a high-polymer type of coating material which is applied to the beads as a liquid sub-polymer or monomer and thereafter polymerized in situ to its final state. Another expedient is to use a synthetic resin type of coating which is set-up after coating of the beads. A further expedient is to coat the beads with a powdered thermoplastic coating composition, using a suitable liquid binder to hold the powder coating in place, followed by heating to fuse the particles into a continuous coating (in this case the liquid binder may be a plasticizer soluble in the powder, which will also assist in the fusing of the particles, or may be a volatile liquid which will evaporate off during the fusing step).

The composition used to form the coating (such as indicated above) may be applied to the glass beads in various ways, depending in part on the character of the composition. Thus the glass beads may simply be mixed with a liquid coating composition, which adheres to the beads in sufficient amount to form a coating when the beads are then removed and subjected to heating as described in the next paragraph to dry or set-up the coating on the free beads. Another expedient is to sprinkle or blow the beads through a fine mist or spray of the coating composition, in which case the glass beads and the spray may be electrostatically charged so as to have opposite charges causing the spray particles to be drawn to the glass beads. Another expedient is to mix the glass beads with the liquid coating composition and then spray the mixture through an orifice, with the result that the emerging glass beads will be separated apart and each will carry a coating. An ordinary type of spray gun can be used with small glass beads a few mils in diameter.

In order to prevent a mass of the coated beads from bonding together during the making procedure, the coated beads may be sprayed or sprinkled, or otherwise introduced, into the top of a long vertical pipe, counter-currently to an ascending current of hot air, super-heated steam, or other hot gas, which has a sufficient velocity to cause the coated beads to fall at a slow rate. During the downward travel in this pipe, the coating is dried, polymerized, cured or fused, as the case may be, to form the coating in at least a sufficiently advanced state so that the coated beads can be further handled without sticking together. Different temperatures may be used in different portions of the pipe. Thus when the coating is fused in the upper portion of the pipe, the lower portion may be provided with a sufficiently lower temperature to solidify the fused coatings. Owing to the small size of the glass beads which may be used (as in the case of beads having a diameter of about 6 mils, for example), it is easy to arrange matters so that a very low rate of fall is obtained even with a slowly upward moving hot gas. Any tendency of the falling coated beads to stick together can be prevented or minimized by electrostatically charging the coated beads so as to cause them to repel each other as they float down. As the coatings are liquid at some stage, surface tension forces will cause a uniform coating to be produced.

Instead of using hot air or other hot gas as a gaseous medium in the manner just described, in the forming of the coatings, use may be made of a suitable hot liquid medium, in which the coating material is insoluble. The coated beads are dispersed in this hot liquid and subjected to heating until the desired setting-up of the coating is produced, followed by cooling of the liquid medium when a cooling step is necessary (as for solidifying a fused coating). The coated beads are then separated from the liquid medium.

If the coating procedure, such as has been described, has not fully set-up the coating to its final state, completion of the curing of the coating may then be effected in a further step, as by passing the coated beads through a rotary heating kiln. Another expedient is to embed the coated beads, in their semi-completed state, in the reflective binder layer 11 of the reflector structure, and complete the cure of the coating during heating of the reflector product employed to set-up the reflective binder. This expedient has value in producing an exceptionally strong interbonding between the transparent coating and the reflective binder, when the respective compositions are so chosen as to be compatible.

An example of a coating composition which firmly bonds to the glass surface of a bead is a "Bakelite" (phenol-aldehyde) type which is applied as an aqueous solution of the resin-forming composition in its "A stage" (water-soluble stage), followed by heating to remove the water and advance the resin to its cured insoluble stage. The water-soluble resin is hydrophilic and anchors firmly to the glass surface, which is also hydrophilic and readily wetted. The subsequent curing of the resin coating causes the coating to have a hydrophobic or organophilic surface adapted to strongly bond to the reflective binder in which the coated beads are subsequently embedded.

A further example of a coating composition is plasticized polyvinyl butyral ("Butvar") dissolved in a volatile solvent such as "Cellosolve" (ethyleneglycol monoethylether). In this case evaporation of the solvent is all that is necessary as this synthetic resin is already in its final state.

A further example of a coating composition is

"Beetle No. 227–8" (made by American Cyanamid Co.), which is a 50% solution of urea-formaldehyde resin in a volatile solvent composed of 60% butyl alcohol and 40% xylol. This resin is of the thermosetting type and the coating, after evaporation of the solvent, must be cured by heating. This curing may be accomplished in part after the coated beads have been embedded in the reflective binder of the reflector.

An example of a thermoplastic coating material is ethyl cellulose.

Methyl methacrylate, and methyl acrylate, polymers are further examples of polymer coating materials which form clear, water-white coatings.

After embedding of the coated beads to form the structure shown in Fig. 1, the exposed portions of the coatings, which cover the outer portions of the glass beads, can be removed in various ways to make the product shown in Fig. 2. A wire brush, such as a brush made of Phosphor bronze wires, can be used to abrade off the coatings. An abrasive sheet (such as "sandpaper") can be employed, using a type having abrasive grits which are soft enough not to scratch the underlying surfaces of the glass beads. A continuous abrasive belt sander, in which the abrasive belt passes around a resilient roller so as to provide a yieldable abrasive surface, may be used—the beaded reflector sheet being moved tangentially across the curved surface of the roller. When the reflex reflector is made in the form of continuous sheeting, the beaded sheet can be drawn around a resilient roller positioned so as to press the curved surface of the beaded sheet against the curved surface of the abrasive belt moving on its roller. Instead of using a sandpaper type of abrasive belt, use may be made of a fabric belt having a rubber surfacing, and a slurry of abrasive grits in water can be used to cause an abrading action. Solvents and other agents can be used to soften the exposed coatings to facilitate removal. A final buffing procedure can be employed to insure that the outer bead extremities have been cleaned off.

Having described various embodiments of our invention, for purposes of illustration rather than limitation, what we claim is as follows:

1. A reflex light reflector including a multiplicity of small transparent glass spheres forming a surface layer of convex lens elements of which there are many thousands per square foot of surface, a reflective binder layer underlying said spheres and formed to provide concave reflecting surfaces substantially concentric to the rear surfaces of the spheres and spaced therefrom, and interposed transparent coating material serving to hold the spheres in spaced relation to the reflective binder, such that the distance from the center of each sphere to the underlying concave reflective surface is greater than the distance to the outer surface which receives incident light.

2. A reflex light reflector of the class in which a surface layer of small transparent glass spheres is partially embedded in a reflective binder, there being many thousands of said spheres per square foot of surface, characterized by the fact that each sphere carries a transparent coating on its rear surface which holds it in spaced relation to the reflective binder, the latter conforming to the outer surface of the coating to provide a concave reflective surface underlying and spaced from the sphere, said transparent coating not extending over the front surface of the sphere.

3. In association with a roadway surface, a reflex reflecting marker or indicia comprising a layer of reflective paint united to the roadway surface and a layer of small transparent glass spheres partially embedded in said layer of paint, there being many thousands of said spheres per square foot, and a transparent binder coating upon the rear surface of each sphere to provide a rounded surface of greater radius than the sphere to which the underlying paint is conformed so as to provide a concave reflector beneath and spaced from each sphere, whereby a combination of high brilliancy and high angularity characteristics is secured, said transparent coating not extending over the front surface of the sphere.

4. In association with a roadway surface, a reflecting marker or indicia comprising a layer of reflective paint united to the roadway surface and a layer of small transparent glass beads partially embedded in said paint layer, there being many thousands of said spheres per square foot, the glass beads being each entirely coated with a transparent coating adapted to be removed from the outer extremities of the glass beads as thus located without removal of the coating from the inner extremities of the beads.

5. A method of making reflex light reflectors of the class having a light-returning layer of small transparent glass spheres united to a reflective support, comprising forming a plastic layer of reflective binder material, partially embedded therein a layer of small transparent glass spheres having totally surrounding transparent concentric coatings, the spheres being so small that there are many thousands per square foot, solidifying the binder layer to provide a unitary structure in which the glass spheres are secured in spaced relation to the resultant underlying reflector surface of the reflective binder which is conformed to the rounded surfaces of the transparent coatings of the glass spheres, and removing the exposed transparent binder coatings from the outer portions of the glass spheres.

HARRY HELTZER.
JOHN EDMUND CLARKE.

REFERENCES CITED

The following references are of record in the file of this patent:

UNITED STATES PATENTS

| Number | Name | Date |
|---|---|---|
| 1,902,440 | Gill | Mar. 2, 1933 |
| 2,143,946 | Hunter | Jan. 17, 1939 |
| 2,149,171 | Grote | Feb. 28, 1939 |
| 2,214,369 | Hammarbach | Sept. 10, 1940 |
| 2,268,538 | Rodli et al. | Dec. 30, 1941 |
| 2,273,847 | Eckel | Feb. 24, 1942 |
| 2,294,930 | Palmquist | Sept. 8, 1942 |
| 2,354,049 | Palmquist | July 18, 1944 |

FOREIGN PATENTS

| Number | Country | Date |
|---|---|---|
| 321,729 | Italy | Oct. 15, 1934 |
| 362,136 | Germany | Oct. 24, 1922 |
| 497,321 | Germany | May 6, 1930 |